(12) United States Patent
Suggs et al.

(10) Patent No.: US 9,710,276 B2
(45) Date of Patent: Jul. 18, 2017

(54) EXECUTION OF INSTRUCTION LOOPS USING AN INSTRUCTION BUFFER

(71) Applicant: Advanced Micro Devices, Inc., Sunnyvale, CA (US)

(72) Inventors: David N. Suggs, Austin, TX (US); Luke Yen, Raleigh, NC (US); Steven Beigelmacher, Ann Arbor, MI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 642 days.

(21) Appl. No.: 13/673,244

(22) Filed: Nov. 9, 2012

(65) Prior Publication Data

US 2014/0136822 A1 May 15, 2014

(51) Int. Cl.
*G06F 9/38* (2006.01)
*G06F 9/30* (2006.01)
*G06F 9/32* (2006.01)

(52) U.S. Cl.
CPC .......... *G06F 9/381* (2013.01); *G06F 9/30065* (2013.01); *G06F 9/30145* (2013.01); *G06F 9/325* (2013.01); *G06F 9/3802* (2013.01); *G06F 9/3808* (2013.01); *G06F 9/3814* (2013.01); *G06F 9/3867* (2013.01)

(58) Field of Classification Search
None
See application file for complete search history.

(56) References Cited

U.S. PATENT DOCUMENTS

| | | | | |
|---|---|---|---|---|
| 6,223,254 | B1 * | 4/2001 | Soni | G06F 9/30174 711/123 |
| 6,671,799 | B1 * | 12/2003 | Parthasarathy | 712/241 |
| 6,772,355 | B2 * | 8/2004 | Homewood | G06F 1/3203 713/320 |
| 7,287,148 | B2 * | 10/2007 | Kanapathippillai | G06F 1/3203 712/35 |
| 7,669,042 | B2 * | 2/2010 | Pisek | G06F 8/4432 712/241 |
| 9,026,769 | B1 * | 5/2015 | Jamil | G06F 9/3855 712/214 |
| 9,354,875 | B2 * | 5/2016 | Merten | G06F 9/30065 |
| 9,367,317 | B2 * | 6/2016 | Combs | G06F 9/30145 |
| 9,524,011 | B2 * | 12/2016 | Hall | G06F 1/3234 |
| 2002/0087900 | A1 * | 7/2002 | Homewood | G06F 1/3203 713/320 |
| 2002/0178350 | A1 * | 11/2002 | Chung | G06F 9/325 712/241 |

(Continued)

OTHER PUBLICATIONS

'Instruction Fetch Energy Reduction Using Loop Caches for Embedded Applications with Small Tight Loops' by Lea Hwang Lee et al., copyright 1999, ACM.*

(Continued)

*Primary Examiner* — Steven Snyder

(57) ABSTRACT

In a normal, non-loop mode a uOp buffer receives and stores for dispatch the uOps generated by a decode stage based on a received instruction sequence. In response to detecting a loop in the instruction sequence, the uOp buffer is placed into a loop mode whereby, after the uOps associated with the loop have been stored at the uOp buffer, storage of further uOps at the buffer is suspended. To execute the loop, the uOp buffer repeatedly dispatches the uOps associated with the loop's instructions until the end condition of the loop is met and the uOp buffer exits the loop mode.

22 Claims, 6 Drawing Sheets

(56) References Cited

U.S. PATENT DOCUMENTS

| | | | |
|---|---|---|---|
| 2004/0193858 A1* | 9/2004 | Ahmad | G06F 9/325 |
| | | | 712/241 |
| 2006/0036834 A1* | 2/2006 | Maiyuran | G06F 9/3808 |
| | | | 712/214 |
| 2008/0229074 A1* | 9/2008 | Miller et al. | 712/208 |
| 2012/0079303 A1* | 3/2012 | Madduri | G06F 1/3203 |
| | | | 713/324 |
| 2012/0124301 A1* | 5/2012 | Hardage | G06F 5/065 |
| | | | 711/154 |
| 2012/0185714 A1* | 7/2012 | Chung et al. | 713/323 |
| 2013/0339699 A1* | 12/2013 | Blasco-Allue | G06F 9/381 |
| | | | 712/241 |
| 2015/0293577 A1* | 10/2015 | Hall | G06F 1/3234 |
| | | | 713/320 |
| 2017/0031834 A1* | 2/2017 | Cerny | G06F 9/3808 |

OTHER PUBLICATIONS

'Instruction Buffering Exploration for Low Energy Embedded Processors' by Tom Vander Aa et al., Journal of Embedded Computing Low-power Embedded Systems, vol. 1 Issue 3, Aug. 2005, pp. 341-351.*

'Revolver: Processor Architecture for Power Efficient Loop Execution' by Mitchell Hayenga et al., copyright 2014, IEEE.*

'Power-Efficient Loop Execution Techniques' dissertation by Mitchell Bryan Hayenga, University of Wisconsin-Madison, copyright by Mitchell Bryan Hayenga, 2013.*

'Power Impact of Loop Buffer Schemes for Biomedical Wireless Sensor Nodes' by Antonio Artes et al., published—sensors, Nov. 6, 2012.*

\* cited by examiner

EXECUTION OF INSTRUCTION LOOPS USING AN INSTRUCTION BUFFER

BACKGROUND

Field of the Disclosure

The present disclosure generally relates to processors, and more particularly to execution of loops at a processor.

Description of the Related Art

Processor architectures typically employ an instruction pipeline having multiple stages, each stage performing corresponding operations to process the instructions. These stages generally include a fetch stage, a decode stage, a dispatch stage, and an execution stage, among others. The fetch stage operates to fetch instructions from memory and provide the fetched instructions to the decode stage, which decodes the provided instructions into micro-operations. The dispatch stage dispatches the micro-operations to corresponding execution units at the execution stage. In a conventional system, the execution of an instruction requires the fetching and decoding of the instruction for each instance of the instruction in a program order.

BRIEF DESCRIPTION OF THE DRAWINGS

The embodiments may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate techniques for employing a micro-operation (uOp) buffer to execute loops in an instruction pipeline so as to reduce a processor's power consumption. In a normal, non-loop mode the uOp buffer receives and stores for dispatch the uOps generated by a decode stage based on a received instruction sequence. In response to detecting a loop in the instruction sequence, the uOp buffer is placed into a loop mode whereby, after the uOps associated with the loop have been stored at the uOp buffer, storage of further uOps at the buffer is suspended. To execute the loop, the uOp buffer repeatedly dispatches the uOps associated with the loop's instructions until the end condition of the loop is met and the uOp buffer exits the loop mode. In addition, an instruction byte buffer of the instruction pipeline can also enter its own loop mode, wherein it suspends provision of instruction bytes to the decode stage and provides instruction bytes only to the uOp buffer. Because they are not used while the uOp buffer is in the loop mode, accesses to the decode and fetch stages are suppressed during execution of the loop's uOps, thereby reducing power consumption.

Figure 1:
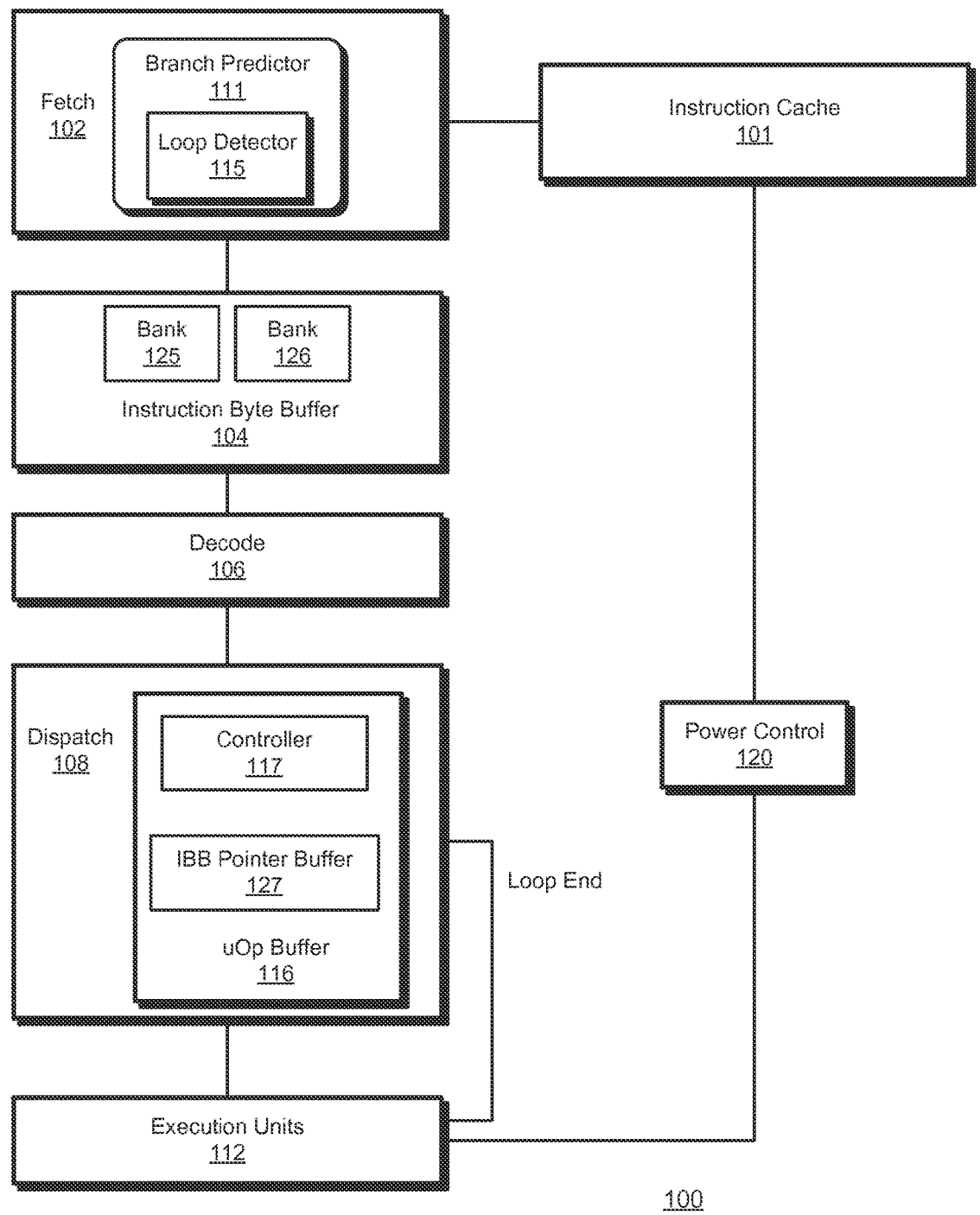
FIG. 1 is a block diagram of an instruction pipeline of a processor in accordance with some embodiments.

FIG. 1 illustrates portions of an instruction pipeline 100 of a processor in accordance with some embodiments. The processor can include a central processing unit, graphics processing unit, digital signal processor and the like, or any combination thereof, implemented by one or more processing cores each having one or more instruction pipelines. The processor can be a part of any of a number of electronic devices, including a personal computer device, server device, computer tablet device, hand-held electronic device, cell phone, and the like. The instruction pipeline 100 is configured to execute sets of instructions in order to carry out tasks for the processor. Each set of instructions is a portion of a computer program, such as an operating system (OS), application program, device driver, and the like. During start-up of the electronic device in which the processor is implemented, a specified computer program, such as an OS, is automatically designated for execution by the electronic device. The instructions of the specified program are retrieved from memory (not shown) and are executed by the instruction pipeline 100.

To execute a computer program, the instruction pipeline 100 performs a set of one or more defined operations for each of the computer program's instructions. Performing the set of defined operations for a given instruction is referred to as processing or executing the instruction. The instructions for a particular computer program are intended to be processed in a defined order, referred to as the program instruction order, in order to achieve a desired result. It will be appreciated that the instruction pipeline 100, or selected stages thereof, can execute instructions in an order other than their program instruction order, but execute the instructions in such a way that the result matches the result expected by executing the instructions according to the program instruction order.

The instruction pipeline 100 includes a fetch stage 102, a decode stage 106, dispatch stage 108, and an execution stage having one or more execution units 112. The instruction pipeline 100 can also include additional stages not illustrated at FIG. 1, such as a retire stage. Each stage of the instruction pipeline 100 is configured to perform one or more designated tasks for processing an instruction. Further, each stage of the instruction pipeline 100 is configured such that it can perform its tasks independent of the tasks being concurrently performed at another stage. This independence between the stages allows instructions to be processed in a pipelined fashion, whereby one instruction can, for example, be decoded at the decode stage 106 while, concurrently, the operations associated with a different instruction are dispatched by the dispatch stage 108.

The instruction pipeline 100 includes additional components to facilitate the processing of instructions, including an instruction cache 101, an instruction byte buffer 104, and a power control module 120. The instruction cache 101 is a memory structure configured to store instructions to be executed by the instruction pipeline 100. In particular, the instruction pipeline 100 is configured to retrieve instructions for processing according to the program instruction order. In some embodiments, the instruction pipeline 100 includes a register (not shown) to store an instruction pointer that identifies the memory address of the next instruction to be executed. The fetch stage 102 is configured to determine the instruction pointer, and request the corresponding instruction from the instruction cache 101. The instruction cache 101 determines if it stores the instruction and, if so, provides it to the fetch stage 102. If the instruction cache 101 does not store the requested instruction, it retrieves the instruction from system memory (not shown) and provides it to the fetch stage 102.

The fetch stage 102 monitors the program instruction order, determines the next instruction in the program instruction order, and provides the requisite control signaling for retrieval of the next instruction. The fetch stage 102 can also perform other functions to enhance processing efficiency. For example, in the illustrated embodiment, the fetch stage 102 includes a branch predictor 111 that predicts, based on the instructions provided by the instruction cache 101, whether a branch is predicted to occur. In particular, instruction branches sometimes repeat in a program instruction order, such that the instructions after a branch are predictable. By predicting a branch using the branch predictor 111, the fetch stage 102 can improve processing efficiency. For example, in some embodiments, in response to predicting a branch the fetch stage 102 can instruct the instruction cache 101 to prefetch the instructions predicted to follow the predicted branch to the instruction cache 101. The instructions that follow the branch can therefore be executed more quickly.

The branch predictor 111 includes a loop detector 115 that detects loops based on predicted branches. In particular, instruction loops (also referred to as "loops") are often indicated by repeated instances of a particular branch. Accordingly, in response to determining that a particular branch is predicted to repeatedly occur within a particular amount of time, the loop detector 115 detects a loop. In response to detecting the loop, the loop detector 115 marks the instruction that is predicted to indicate the start of each iteration of the loop (the first instruction in the loop) and the instruction that indicates the end of each iteration of the loop (the last instruction of the loop). In some embodiments, the loop detector 115 marks the start and end instructions of the loop by setting a corresponding bit in a field of each of the start and end instructions to a defined state. As described further below, the marked instructions can be used to determine the size of the loop (e.g. the number of instructions in the loop) in order to determine whether the loop's instructions can be processed more efficiently in a loop mode.

For each instruction retrieved from the instruction cache 101, the fetch stage 102 separates the instruction into a set of instruction bytes representative of the retrieved instructions and stores the bytes at the instruction byte buffer (IBB) 104. In particular, each retrieved instruction includes a number of fields, whereby each field can include one or more bytes of information. The fetch stage 102 separates the bytes of each field to ease processing at subsequent stages of the instruction pipeline 100. For example, in some embodiments the instruction bytes for an instruction includes instruction prefix information, op code information, addressing mode information, address displacement information (indicating an offset for addressing of operand data for the instruction), and immediate data information (indicating a defined value for an operand).

The decode stage 106 is configured to determine which instruction bytes stored at the IBB 104 constitute the next instruction, retrieved the identified bytes, and decode each instruction byte into one or more uOps. The dispatch stage 108 includes a uOp buffer 116 and a controller 117. The controller 117 stores uOps received from the decode stage 106 at the uOp buffer 116. In addition, the controller 117 is configured to determine, for each uOP stored at the uOp buffer 116, which of the execution units 112 is to execute the uOP. The controller 117 further determines when each of the execution units 112 is ready to execute another uOp, and provides each stored uOp to its corresponding execution unit when the unit is ready to execute the uOp.

The execution units 112 execute uOps dispatched from the uOp buffer 116. The execution units 112 can include integer units to perform integer arithmetic, floating point units to perform floating point arithmetic, load/store units to retrieve store and store data from memory, and the like. The execution units 112 can also detect the occurrence of particular conditions at the instruction pipeline 100, including whether an end condition of a loop has been satisfied. For example, an instruction of a loop can indicate that the loop is to be exited in response to a value in a register (not shown) of the instruction pipeline 100 matches a threshold value. The execution units 112, in response to executing the loop's instructions, can determine that the value at the register matches the threshold value and indicate that the end condition of the loop has been satisfied. In other situations, the end of a loop is indicated by a particular instruction or micro-operation, such as a branch instruction. Accordingly, the execution units 112 detect the end of the loop by executing the micro-operations of the end instruction. In response to detecting the end of the loop, the execution units 112 notify the dispatch unit 108 via a signal labeled "Loop End."

The uOp buffer 116 and controller 117 can operate in two different modes: a normal mode and a loop mode. In the normal mode, the controller 117 retrieves uOps from the decode stage 106 and stores the received uOps at the uOp buffer 116 for subsequent dispatch to their corresponding execution units. In the loop mode, the controller 117 does not retrieve uOps from the decode stage 106, but instead repeatedly provides stored uOps associated with a loop to their corresponding execution unit until one of the execution units indicates an end of the loop.

To illustrate, in the normal mode the controller 117 analyzes each received uOp to determine whether the received uOp has been marked as the beginning of a loop. If not, the controller 117 and the uOp buffer 116 are maintained in the normal mode. In response to detecting that a uOp is marked as the beginning of a loop iteration (the "start uOp"), the controller 117 enters a potential-loop state, whereby it continues to receive uOps from the decode stage 106 and analyzes the received uOps to determine the uOp that marks the end of the loop iteration (the "end uOp"). In response to detecting the end uOp, the controller 117 determines whether all of the uOps between the start uOp and the end uOp (the "loop uOps") can be stored at the uOp buffer 116. That is, the controller 117 determines whether the buffer 116 has the capacity to store all of the uOps between the start and end uOps (including both the start and end uOps). If the loop uOps cannot all be stored at the uOp buffer 116, the controller 117 maintains itself and the uOp buffer 116 in the normal mode.

If all of the loop uOps can be stored at the uOp buffer 116, the controller 117 enters the loop mode. In the loop mode, the controller 117 does not retrieve uOps from the decode stage 106, but instead repeatedly provides the loop uOps from the uOp buffer 116 to the execution units 112 for execution until one or more of the execution units 112 indicates the loop's end condition has been satisfied via the Loop End signal. The controller 117 ensures that the loop uOps are provided to the execution units 112 in the appropriate order for execution of the loop. In response to receiving an indication from one or more of the execution units 112 that the loop's end condition has been satisfied, the controller 117 returns the uOp buffer 116 to normal mode, and resumes retrieving uOps from the decode stage 106.

The power control module 120 is configured to control a power mode of the instruction cache 101, the fetch stage 102, and the decode stage 106, thereby adjusting the amount of power consumed by each stage. In some embodiments, the power control module 120 can place the fetch stage 102 and the decode stage 106 in a reduced power mode by suppressing accesses to the fetch stage 102, such that the fetch stage 102 no longer fetches instructions. The suppression of accesses causes both the fetch stage 102 and the decode stage 106 to remain in a substantially stable, unchanging state, reducing transistor switching and thereby reducing power consumption. In one embodiment, the power control module 120 suppresses access to the fetch stage 102 and to the decode stage 106 by gating off one or more input connections to these stages. In other embodiments, accesses to each stage can be suppressed by gating clock signals associated with the stages, by changing a clock frequency associated with each stage, changing a reference voltage level for these stages, and the like. The power control module 120 can return the fetch stage 102 and the decode stage 106 from the low-power mode to a normal mode by permitting accesses to each stage.

The power control module 120 determines the power mode of the instruction cache 101, the fetch stage 102, and the decode stage 106 based on the indications from the controller 117 as to whether the uOp buffer 116 is in the normal mode or the loop mode. In particular, in response to an indication from the controller 117 that the uOp buffer 116 is entering the loop mode, the power control module 120 transitions the fetch stage 102 and the decode stage 106 from the normal mode to the low-power mode. In response to an indication from controller 117 that the loop mode is to be exited and the uOp buffer 116 is returning to normal mode, the power control module 120 transitions the fetch stage 102 and the decode stage 106 from the low-power mode to the normal mode. Accordingly, by employing the uOp buffer 116 to provided decoded instruction information in place of the decode stage 106 during a loop, portions of the instruction pipeline 100 can be placed in low-power modes, thereby reducing power consumption.

In some embodiments, the uOp buffer 116 stores only a subset of the information needed to execute selected uOps. In particular, in these embodiments the uOp buffer 116 does not store immediate and displacement bytes needed to execute selected uOps, referred to for ease of discussion as "I/D uOps". The IBB 104 stores the immediate and displacement bytes for the I/D uOps. The IBB 104 can operate both in normal mode and in loop mode. In normal mode, the IBB 104 provides all of the instruction bytes of an instruction to the decode stage 106 for decoding. In addition, the IBB 104 provides to the uOp buffer 116, in response to a request from the controller 117, the immediate and displacement bytes for the I/D uOps. The uOp buffer 116 provides the immediate and displacement bytes to the execution unit that is executing the corresponding I/D uOp.

In the loop mode, the IBB 104 determines whether the uOp buffer 116 is also in loop mode. If not, the IBB 104 returns to normal mode and continues to provide all of the instruction bytes to the decode stage 106 for decoding. If the uOp buffer 116 is also in loop mode, the IBB 104 stops providing instruction bytes to the decode stage 106. In response, the decode stage 106 suspends operations, thereby reducing power consumption. While in loop mode, the IBB 104 continues to provide immediate and displacement byte information to the uOp buffer 116 for I/D uOps. In response to receiving an indication from the controller 117 that the uOp buffer 116 has exited loop mode, the IBB 104 also exits loop mode and resumes providing instruction bytes to the decode stage 106 for decoding.

To determine whether to enter loop mode, the IBB 104 analyzes received instructions to detect instructions that have been marked as the start and end instructions of a loop. In response to detecting the start and end instructions, the IBB 104 determines whether all of the instruction bytes for the loop's instructions can be stored at the IBB 104. If not, the IBB 104 stays in normal mode. If all of the instruction bytes for the loop's instructions can be stored, the IBB 104 enters the loop mode.

In some embodiments, the IBB 104 and the uOp buffer 116 enter their respective modes at different times in a predetermined sequence. For example, in some embodiments the uOp buffer 116 enters its loop mode first upon detection of a loop, while the IBB continues to receive instruction bytes from the fetch stage 102. Once the IBB 104 determines that it can store all of the instruction bytes for the loop, it enters its own loop mode after the uOp buffer 116 has already entered its loop mode. By entering their loop modes sequentially, rather than concurrently, the IBB 104 and the uOp buffer 116 ensure that they each have of the requisite information from their respective input stages (the fetch stage 102 and the decode stage 106, respectively) in order to be able to support execution of the loop without further information from those input stages. This allows the input stages to be placed in their low power states during execution of the loops.

In some embodiments, the IBB 104 includes a set of banks, whereby information is retrieved from the banks by the uOp buffer 116 in alternating fashion based on a set of pointers to the banks. For example, in the illustrated embodiment, the IBB 104 includes a bank 125 and a bank 126. The instruction byte buffer 104 stores instruction byte information received from the fetch stage 102 at the banks 125 and 126 in alternating fashion, such that an initial byte of an instruction is, for example, stored at bank 125, the next byte of the instruction is stored at bank 126, the next byte is stored at bank 125, and so on. The uOp buffer 116 includes an IBB pointer buffer 127 that stores a set of pointers to the instruction bytes of the IBB 104 stored at the banks 125 and 126. The uOp buffer 116 retrieves the instruction bytes from the IBB 104 using the pointers. Accordingly, in the normal mode, the controller 117 will set up the pointers at the IBB pointer buffer 127 so that sequential pointers alternate between the banks 125 and 126. Thus, for example, the first pointer in the IBB pointer buffer 127 will point to a location of bank 125, the next pointer will point to a location of bank 126, the next pointer will point to a location of bank 125, and so on. This scheme provides for more efficient storage and retrieval of the instruction byte information because while one bank is being used to store instruction bytes received from the fetch stage 102 the other can be used to provide instruction bytes to the decode stage 106 or to the uOp buffer 116.

However, in loop mode, it is possible that the instruction bytes associated with the loop will include an odd number of bytes. In this scenario, the IBB 104 stores the instruction bytes of the loop such that the first instruction byte for each iteration of the loop is stored at alternating banks. For example, if each iteration of the loop includes three instruction bytes, bank 125 is designated Bank A and bank 126 is designated Bank B, the instruction bytes for the loop iterations will be stored as follows: iteration 1: ABA, iteration 2: BAB, iteration 3: ABA iteration 4: BAB, and so on. Accordingly, in loop mode the controller 117 alternates the pointers at the IBB pointer buffer 127 for each iteration of the loop so that the correct instruction bytes will be retrieved from the correct bank. Thus, in the example above, for odd numbered iterations of the loop the controller 117 sets up the pointers so that the first pointer points to Bank A, the second pointer points to Bank B, and the third pointer points to Bank A. For even numbered iterations of the loop the controller 117 sets up the pointers so that the first pointer points to Bank B, the second pointer points to Bank A, and the third pointer points to Bank B. The controller 117 thus ensures that the correct instruction bytes are retrieved, and allows the IBB 104 to continue to use its banking structure in the loop mode.

Figure 2:
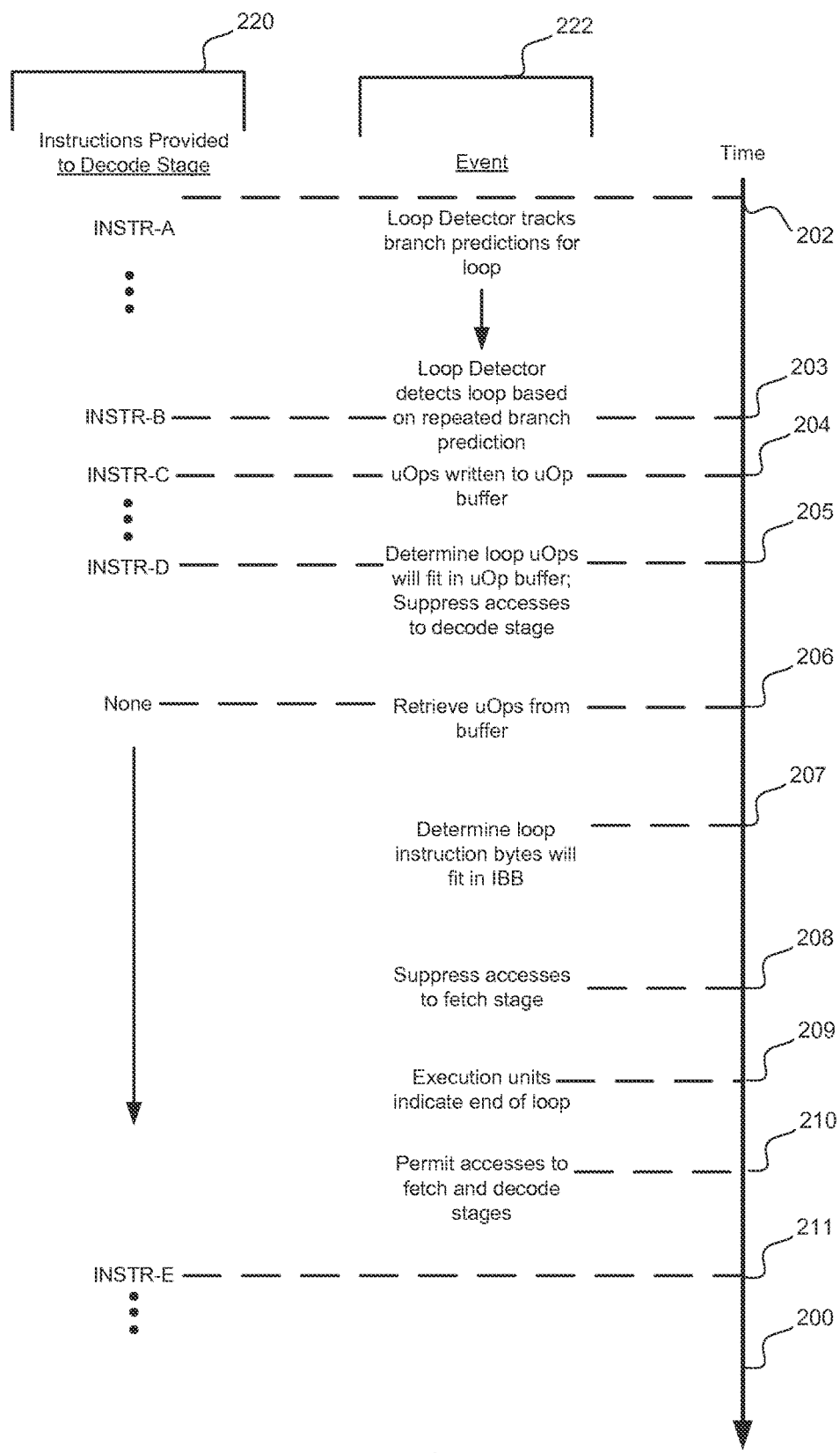
FIG. 2 is a diagram illustrating an example operation of the instruction pipeline of FIG. 1 in accordance with some embodiments.

FIG. 2 illustrates a diagram showing timeline 200 of an example operation of the instruction pipeline 100 in accordance with some embodiments. In the illustrated example, column 220 shows the instructions that are provided, via their corresponding instruction bytes, to the decode stage 106. Column 222 illustrates particular events that take place at the instruction pipeline 100. In addition, FIG. 2 shows a timeline to indicate the relative timing of particular events. In the depicted example, column 220 illustrates an instruction, labeled INSTR-C, that is the initial instruction of a loop and an instruction, labeled INSTR-D, that is the last instruction of the loop initiated by INSTR-C. The loop is referred to as "loop C-D" for purposes of illustration Between time 202 and time 203, the loop detector 115 monitors branch predictions by the branch predictor 111 the instruction byte buffer for a potential loop. In the illustrated example, it is assumed that the branch predictor 111 indicates that INSTR-C is the start instruction of a loop and INSTR-D is the last instruction of the loop. Accordingly, at time 203, the loop detector 115 marks INSTR-C as the start instruction and of loop C-D and marks INSTR-D as the last instruction of loop C-D. At time 204, the controller 117 detects the marked INSTR-C as being provided to the decode stage 106.

At time 205 the controller 117 determines that all of the uOps associated with Loop C-D can be stored at the uOp buffer 116. Accordingly, the controller 117 indicates to the power control module 120 that the loop mode has been entered. In response, the power control module 120 suppresses accesses to the decode stage 106 by gating the clock signals provided to this stage. In addition, beginning at time 206 the dispatch stage 108 retrieves uOps for Loop C-D from the uOp buffer 116. Therefore between times 206 and time 209, described below, instructions are not provided to the decode stage 106. At time 207 the IBB 104 determines that all of the instruction bytes for the loop will fit in the IBB 104. In response, it enters its own loop mode and at time 208 the power control module 120 suppresses accesses to the fetch stage 102, thus reducing power consumption.

At time 209 one of the execution units 112 determines that the conditions to end Loop C-D are to be satisfied within a threshold amount of time, such that the fetch stage 102 and decode stage 106 should be returned to their normal states. Accordingly, at time 210 the uOp buffer 116 indicates to the power control module 120 that the loop mode is being exited. In response, the power control module 120 returns the fetch stage 102 and the dispatch stage 106 to their normal operating modes by resuming provision of clock signals to these stages. At time 211 the next instruction (INSTR-E) in the program instruction order is provided to the dispatch stage for processing. In some embodiments, the execution units 112 determines the end of Loop C-D sufficiently in advance such that the first uOp associated with INSTR-E is provided to the dispatch stage 108 within one clock cycle of the last uOp associated with Loop C-D being dispatched to its corresponding execution unit, thereby minimizing processing lag.

Figure 3:
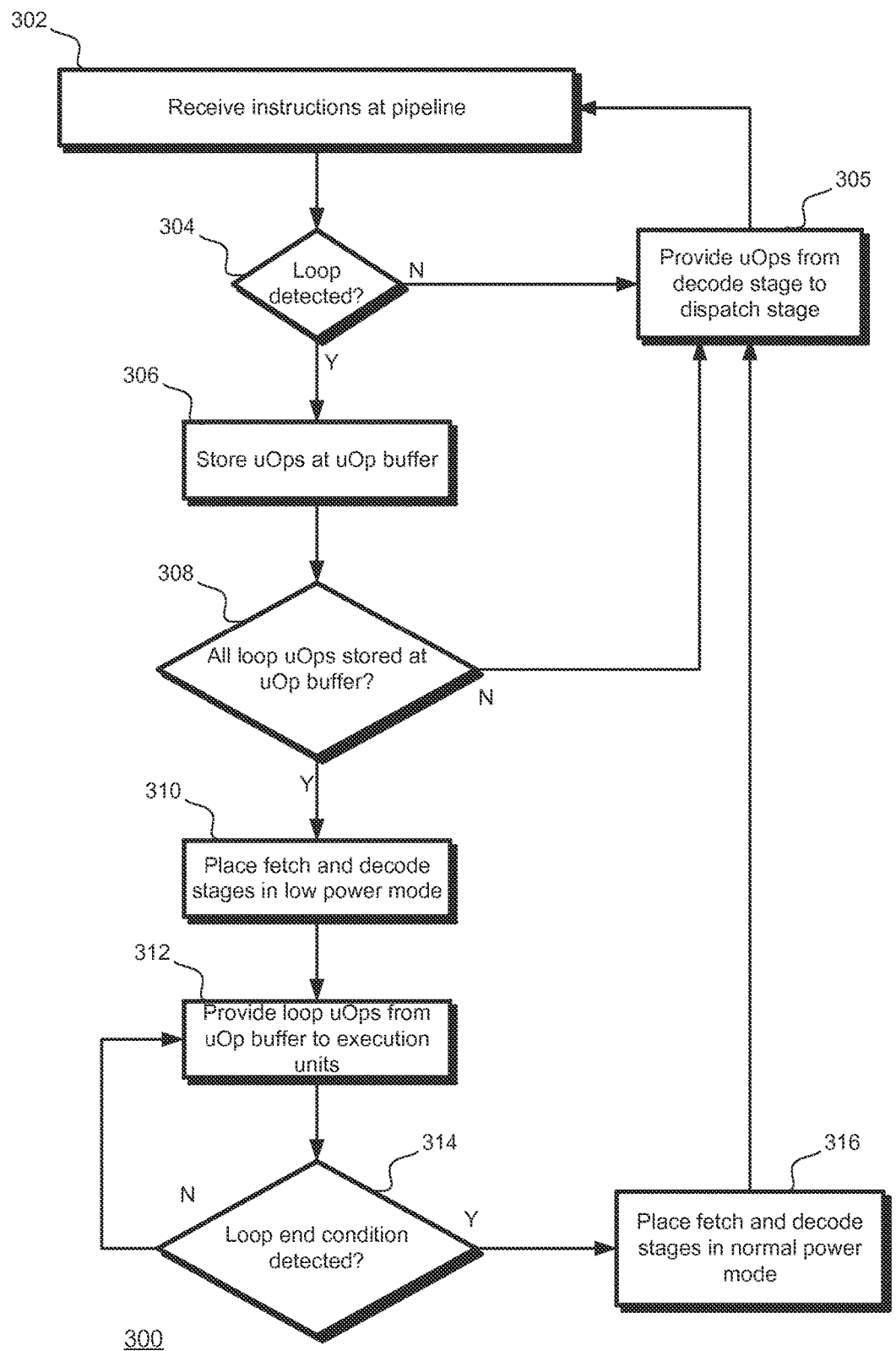
FIG. 3 is a flow diagram of a method of processing a loop at the instruction pipeline of FIG. 1 in accordance with some embodiments.

FIG. 3 illustrates a flow diagram of a method 300 of processing a loop at the instruction pipeline 100 of FIG. 1 in accordance with some embodiments. At block 302 the instruction pipeline 100 receives instructions at the fetch stage 102. The fetch stage 102 processes the received instructions to determine sets of instruction bytes and stores the instruction bytes at the IBB 104. The decode stage 106 retrieves the instruction bytes from the IBB 104, decodes the instruction bytes to determine a stream of uOps. The loop detector 115 monitors branch predictions and determines, at block 304, if a loop is to be executed at the instruction pipeline 100. If the loop detector 115 does not detect a loop, the method flow proceeds to block 305 and the decode stage 106 provides the stream of uOps to the dispatch stage 108. In response, the controller 117 stores the uOps at the uOp buffer 116 for subsequent dispatch to the execution units 112.

If, at block 304, the loop detector 115 detects a loop the decode stage 106 provides the stream of uOps to the uOp buffer 116 for storage. At block 308 the controller 117 determines that the uOps for the last instruction of the loop has been stored at the uOp buffer 116. In response, the uOp buffer 116 determines whether all of the uOps for the loop instructions are stored at the uOp buffer 116. That is, the uOp buffer 116 determines whether all of the uOps for the loop can fit within the uOp buffer 116 simultaneously. If not, the loop cannot be properly executed by using the uOps stored at the uOp buffer 116. Accordingly, the method flow moves to block 305 and the decode stage 106 continues to provide the stream of uOps to the dispatch stage 108. In particular, until the end condition of the loop is satisfied, the fetch stage 102 will repeatedly fetch the loop instructions, the loop instructions will be repeatedly decoded at the decode stage 106, and the resulting uOps will repeatedly be provided by the decode stage 106 to the dispatch stage 108 for storage at the uOp buffer 116 and subsequent dispatch to the execution units 112.

Returning to block 308, if the controller 117 determines all of the uOps for the loop can fit within the uOp buffer 116 simultaneously, the method flow moves to block 310 and the controller 117 indicates the uOp buffer 116 is entering the loop mode. In response, the power control module 120 places the fetch stage 102 and the decode stage 106 into the low power mode by suppressing accesses to these stages. At block 312, the uOps for the loop are provided to the execution units 112 from the uOp buffer 116 until the loop's end condition is met.

At block 314 the execution units 112 determine whether the loop's end condition is detected. In some embodiments, the execution units 112 can detect the loop's end condition prior to the condition being met, in order to allow time for the fetch stage 102 and the decode stage 106 to be returned to their normal operating states. If the loop end condition is not detected, the method flow returns to block 312 and the controller 117 continues to provide the loop uOps from the uOp buffer 116 without retrieving uOps from the decode stage 106. If the loop end condition is detected, the method flow moves to block 316 and the controller 117 signals that the loop mode is to be exited. In response, the power control module 120 returns the fetch stage 102 and the decode stage 106 from their low power states to their normal operating states. The method flow proceeds to block 305 and the decode stage 106 resumes providing the stream of uOps to the dispatch stage 108.

Figure 4:
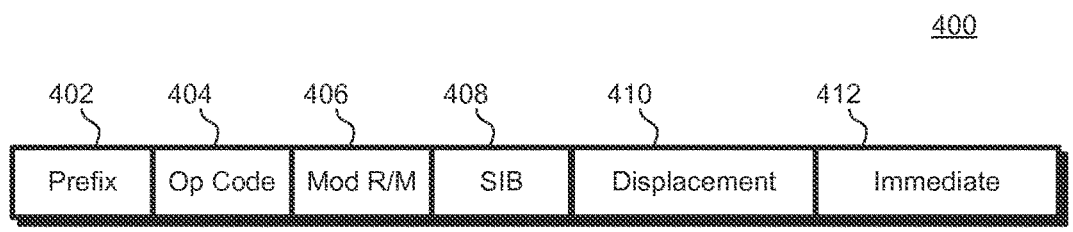
FIG. 4 is a block diagram of instruction bytes that can be stored at an instruction byte buffer of the instruction pipeline of FIG. 1 in accordance with some embodiments.

FIG. 4 illustrates a set 400 of instruction bytes of an instruction that can be stored at the IBB 104 in accordance with some embodiments. As illustrated, the set 400 is encoded according to an x86 instruction format. Accordingly, the set 400 includes a prefix field 402, an op code field 404, a mod R/M field 406, an SIB field 408, a displacement field 410, and an immediate field 412. Each of the fields 402-412 includes one or more bytes of information, and the number of bytes in each field can vary depending on the type of instruction associated with the set 400. In addition, for some types of instructions, one or more of the illustrated fields 402-412 can be omitted. For example, some instructions may not include the SIB field 408, the displacement field 410, or the immediate field 412.

The set 400 of instruction bytes can be stored at the IBB 104 and provided to either the decode stage 106 or the uOp buffer 116, depending upon whether the IBB 104 is in the normal mode or the loop mode. In particular, in the loop mode, the IBB 104 provides all of the instruction bytes of the set 400 to the decode stage 106. In addition, the IBB 104 provides the bytes of the displacement field 410 and the immediate field 412 in response to requests from the controller 117. In the loop mode, the IBB 104 does not provide instruction bytes of the set 400 to the decode stage 106, but continues to provide the bytes of the displacement field 410 and the immediate field 412 in response to requests from the controller 117.

Figure 5:
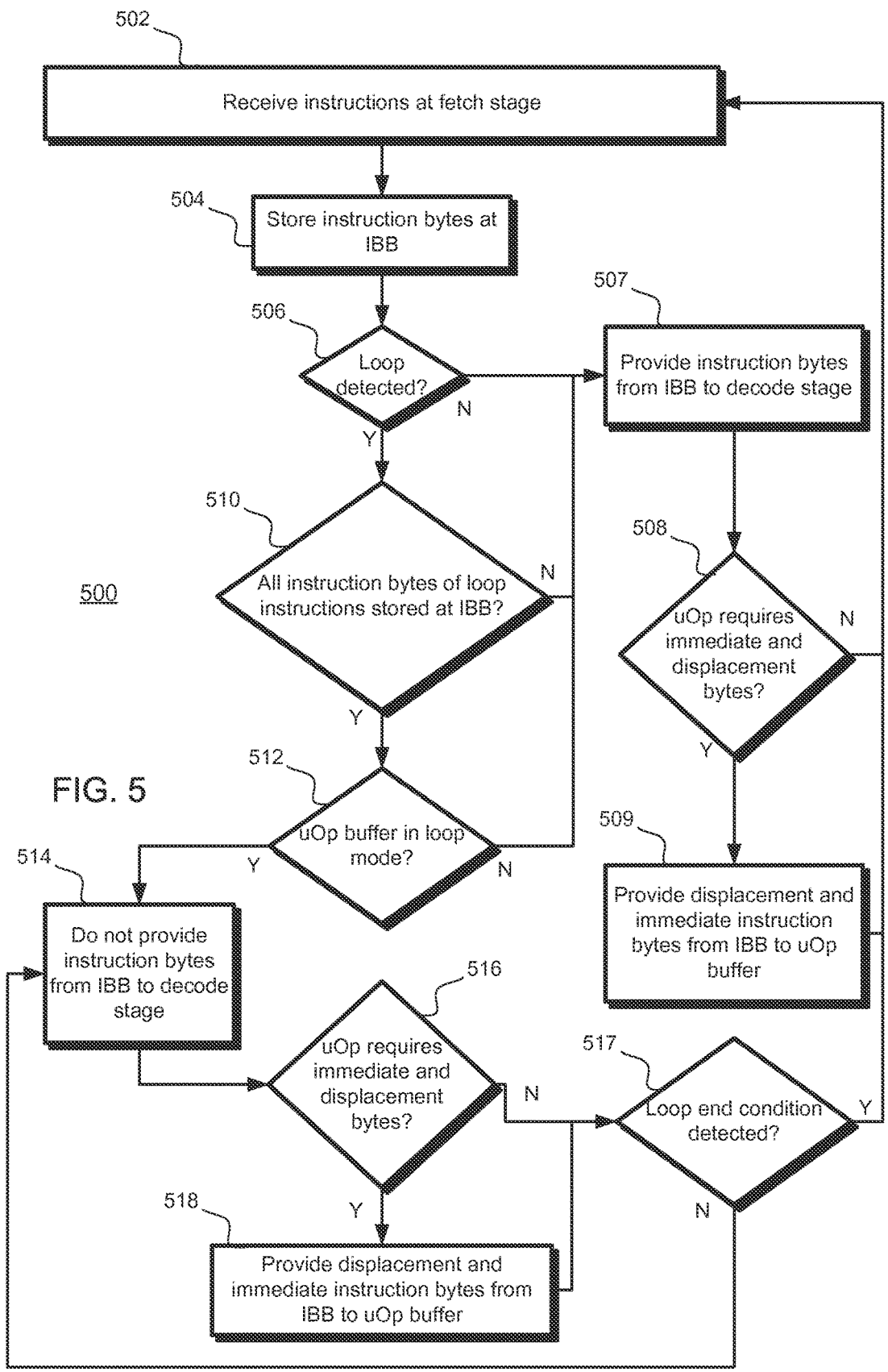
FIG. 5 is a flow diagram of a method of providing instruction bytes from the instruction byte buffer of FIG. 1 in accordance with some embodiments.

FIG. 5 illustrates a flow diagram of a method 500 of processing a loop at the IBB 104 of the instruction pipeline of 100 of FIG. 1 in accordance with some embodiments. At block 502 the instruction pipeline 100 receives instructions at the fetch stage 102. At block 504, the fetch stage 102 processes the received instructions to determine sets of instruction bytes and stores the instruction bytes at the IBB 104. The loop detector 115 monitors the branch predictions by the branch predictor 111 and determines, at block 506, if a loop is predicted to be executed at the instruction pipeline 100. If the loop detector 115 does not detect a predicted loop, the IBB 104 is maintained in the normal mode. Accordingly, the method flow proceeds to block 507 and the IBB 104 provides all of the instruction bytes for each instruction to the decode stage 106 for decoding. The method proceeds to block 508 and the controller 117 determines if a uOp to be dispatched requires immediate or displacement bytes for execution. If not, the method flow returns to block 502. If the controller 107 determines that the uOp to be dispatched does require immediate or displacement bytes, the method flow moves to block 509 and the controller 117 requests the displacement and immediate bytes for the instruction corresponding to the uOp to be dispatched. In response, the IBB 104 provides the requested displacement and immediate bytes to the uOp buffer 116. The method flow returns to block 502.

Returning to block 506, if the loop detector 115 detects a predicted loop it marks the initial and last instructions of the loop. The method flow proceeds to block 510 where the IBB 104 determines if all of the instruction bytes associated with the loop instructions can be stored at the IBB 104. If not, the IBB 104 is maintained in the normal mode and the method flow moves to block 507, described above. If all of the instruction bytes can be stored at the IBB 104, the method flow moves to block 512 and the IBB 104 requests the controller 117 to indicate whether the uOp buffer 116 is in its normal mode or its loop mode. If the uOp buffer 116 is in its normal mode the IBB 104 is maintained in the normal mode and the method flow moves to block 507, described above.

If, at block 512, the controller 117 indicates that the uOp buffer 116 is in its loop mode, the IBB 104 enters its loop mode. Accordingly, the method flow proceeds to block 514 and the IBB 104 stops providing instruction bytes to the decode stage 106. The method proceeds to block 516, and the controller 117 determines, for each uOp it dispatches, whether the uOp requires immediate and displacement bytes. If not, the method flow proceeds to block 517 described below. If a uOp being dispatched requires immediate and displacement bytes, the controller 117 requests the bytes from the IBB 104. In response, the IBB 104 provides to the uOp buffer 116 the immediate and displacement bytes for the instruction associated with the uOp being dispatched.

The method flow proceeds to block 517 and the execution units 112 determine whether the end condition for the loop is detected. If not, the IBB 104 remains in loop mode and the method flow returns to block 514. If the loop end condition is detected, the execution units 112 signal the controller 117, which exits its loop mode. The controller 117 signals the IBB 104 that loop mode has been exited. In response, the IBB 104 exits its loop mode and the method flow returns to block 502.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processor described above. Further, in some embodiments, the features described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
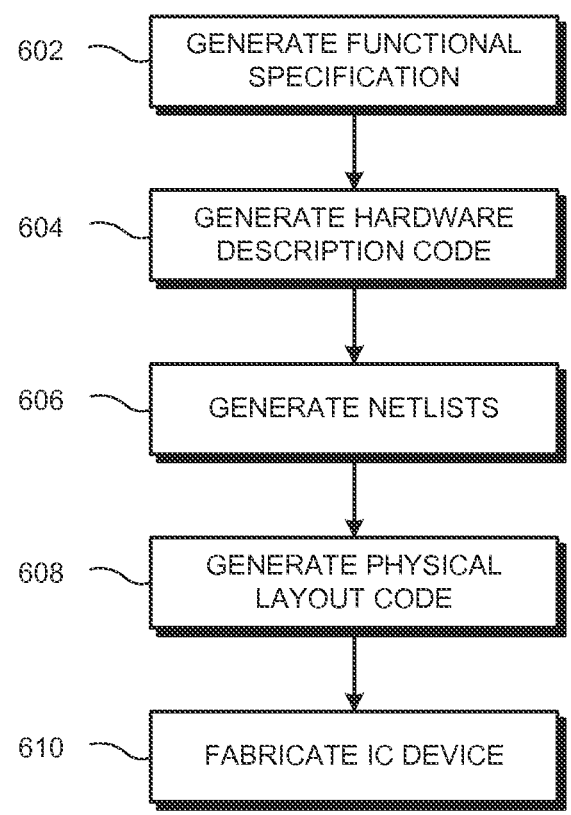
FIG. 6 is a flow diagram illustrating a method for designing and fabricating an integrated circuit device implementing at least a portion of a component of a processor in accordance with some embodiments.

FIG. 6 is a flow diagram illustrating an example method 600 for the design and fabrication of an IC device implementing one or more aspects of the disclosed embodiments in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the disclosed embodiments as set forth in the claims below. Accordingly, the specification and figures are to be regarded in an illustrative rather than a restrictive sense, and all such modifications are intended to be included within the scope of the disclosed embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
in response to detecting an instruction loop at an instruction pipeline of a processor:
for a plurality of iterations of the instruction loop:
providing micro-operations of the instruction loop from a first buffer at a first stage of the instruction pipeline to execution units of the instruction pipeline;
determining, for each micro-operation, whether a subset of instruction bytes associated with a corresponding micro-operation is required to be provided directly from a second buffer to the first buffer for the execution units;
separately providing the subset of the instruction bytes for instructions of the instruction loop from the second buffer to the first buffer, such that the subset of the instruction bytes are re-provided from the second buffer to the first buffer for each of the plurality of iterations of the instruction loop; and
placing a second stage of the instruction pipeline in a reduced power state, the second stage providing the micro-operations of the instruction loop to the first buffer.

2. The method of claim 1, wherein placing the second stage of the instruction pipeline in the reduced power state comprises:
in response to detecting the instruction loop at the instruction pipeline, suspending provision of micro-operations from a decode stage to the first buffer.

3. The method of claim 1, wherein placing the second stage of the instruction pipeline in the reduced power state comprises suppressing access to the second stage.

4. The method of claim 1, wherein the second stage is a fetch stage of the instruction pipeline.

5. The method of claim 1, wherein the second stage is a decode stage of the instruction pipeline.

6. The method of claim 1, wherein detecting the instruction loop at the instruction pipeline comprises:
determining a first instruction is marked as indicating a start of the instruction loop;
determining a second instruction is marked as an end of the instruction loop; and
determining that a storage size of a set of micro-operations decoded from instructions between the first instruction and the second instruction in a program sequence are within a storage capacity of the first buffer.

7. The method of claim 6, wherein detecting the instruction loop at the instruction pipeline further comprises:
determining a first instruction is marked as indicating a start of the instruction loop;
determining a second instruction is marked as an end of the instruction loop; and
determining that a storage size of a set of instruction bytes provided by a fetch stage of the instruction pipeline and determined from instructions between the first instruction and the second instruction in a program sequence are within a storage capacity of the second buffer.

8. The method of claim 1, wherein providing micro-operations of the instruction loop from the first buffer at a first stage of the instruction pipeline to execution units of the instruction pipeline comprises placing the first buffer into a first loop mode prior to placing the second buffer in a second loop mode wherein the second buffer provides instruction bytes to the first buffer.

9. The method of claim 1, wherein the first buffer comprises a first bank and a second bank, and wherein:
providing the micro-operations from the first buffer comprises alternating provision of the micro-operations from the first bank and the second bank based on a set of pointers stored at a third buffer; and
providing instruction bytes from the second buffer to the first buffer comprises:
alternating the pointers stored at the third buffer based on a number of iterations of the loop.

10. A method comprising:
providing instruction bytes from a first buffer to a decode stage of an instruction pipeline of a processor, the decode stage providing micro-operations to a second buffer for execution; and
in response to detecting that an instruction loop is to be executed at the instruction pipeline,
suspending provision of instruction bytes from the first buffer to the decode stage; and
directly providing a subset of the instruction bytes from the first buffer to the second buffer for execution with a micro-operation corresponding to the subset.

11. The method of claim 10, wherein a subset of the instruction bytes includes address displacement information.

12. The method of claim 10, wherein a subset of the instruction bytes includes immediate operand information.

13. The method of claim 10, wherein the first buffer receives the instruction bytes from a fetch stage of the instruction pipeline.

14. The method of claim 10, further comprising resuming provision of instruction bytes from the first buffer to the decode stage in response to detecting an end condition of the instruction loop.

15. A processor comprising:
an instruction pipeline comprising:
a loop detector that detects an instruction loop to be executed at the instruction pipeline;
a fetch stage;
a decode stage;
an execution stage;
a dispatch stage including a first buffer, the dispatch stage receiving micro-operations from the decode stage and storing the micro-operations at the buffer, and providing, for each of a plurality of iterations of the instruction loop, the stored micro-operations from the first buffer to the execution stage in response to the loop detector detecting the instruction loop;
a second buffer that:
receives instruction bytes from the fetch stage;
provides instruction bytes to the decode stage when the loop detector indicates a loop is not being executed;
in response to the loop detector detecting the instruction loop:
suspends provision of a first subset of the instruction bytes to the decode stage;
determines, for each micro-operation, whether a subset of the instruction bytes associated with a micro-operation is required to be provided directly from a second buffer to the first butter for the execution stage; and
provides a second subset of the instruction bytes to the first buffer, such that the second subset is re-provided from the second buffer to the first buffer for each iteration of the instruction loop; and
a power control module that places a selected stage of the instruction pipeline in a reduced power state in response to the loop detector detecting the instruction loop.

16. The processor of claim 15, wherein the dispatch stage, in response to the loop detector detecting the instruction loop, suspends retrieval of micro-operations from the decode stage.

17. The processor of claim 15, wherein the power control module places the selected stage of the instruction pipeline in the reduced power state by suppressing access to the selected stage.

18. The processor of claim 15, wherein the selected stage is the fetch stage.

19. The processor of claim 15 wherein the selected stage is the decode stage.

20. The processor of claim 15, wherein the dispatch stage repeatedly provides the micro-operations from the first buffer in response to detecting that all of the micro-operations of the instruction loop are within a storage capacity of the first buffer.

21. The processor of claim 15, wherein the first buffer provides the stored micro-operations while in a first loop mode, and wherein the second buffer suspends provision of the first subset of instruction bytes to the decode stage while in a second loop mode, the second buffer to enter the second loop mode after the first buffer has entered the first loop mode.

22. The processor of claim 15, wherein the first buffer comprises a first bank and a second bank and, and further comprising a third buffer to store pointers to the first bank and the second bank, and wherein:

the second buffer, between loop iterations, modifies the pointers stored at the third buffer to select one of the first bank and the second bank as an initial bank, and for each loop iteration, alternates provision of the second subset of the instruction bytes between the selected initial bank and the other of the first bank and the second bank.

\* \* \* \* \*